(No Model.) 7 Sheets—Sheet 1.

W. W. MARSH & M. E. BLOOD.
GRAIN BINDING HARVESTER.

No. 275,681. Patented Apr. 10, 1883.

(No Model.) 7 Sheets—Sheet 3.

W. W. MARSH & M. E. BLOOD.
GRAIN BINDING HARVESTER.

No. 275,681. Patented Apr. 10, 1883.

Witnesses:
Albert H. Adams.
B. A. Price

Inventors:
William W. Marsh
Maurice E. Blood
By West & Bond
Their Attys

(No Model.) 7 Sheets—Sheet 5.

W. W. MARSH & M. E. BLOOD.
GRAIN BINDING HARVESTER.

No. 275,681. Patented Apr. 10, 1883.

Witnesses:
Albert H. Adams.
B. A. Price

Inventors:
William W. Marsh.
Maurice E. Blood.
By West & Bond
Their Attys

(No Model.) 7 Sheets—Sheet 6.

W. W. MARSH & M. E. BLOOD.
GRAIN BINDING HARVESTER.

No. 275,681. Patented Apr. 10, 1883.

UNITED STATES PATENT OFFICE.

WILLIAM W. MARSH AND MAURICE E. BLOOD, OF SYCAMORE, ILLINOIS.

GRAIN-BINDING HARVESTER.

SPECIFICATION forming part of Letters Patent No. 275,681, dated April 10, 1883.

Application filed October 10, 1882. (No model.)

*To all whom it may concern:*

Be it known that we, WILLIAM W. MARSH and MAURICE E. BLOOD, residing at Sycamore, in the county of De Kalb and State of Illinois, and citizens of the United States, have invented new and useful Improvements in Grain-Binding Harvesters, of which the following is a full description, reference being had to the accompanying drawings, in which—

This invention relates to that class of grain-harvesting machines in which the grain as cut by the sickle falls upon a conveyer belt or apron, and is delivered directly from such belt or apron to a self-binder to be bound; and it has for its object to improve the construction and arrangement of the devices by which the grain is delivered in proper relation to the binding-arm for the encompassing of the bundle by the cord at or near the center, this whether the straw be long or short; and its nature consists in the devices and combinations of devices hereinafter described, and pointed out in the claims, for attaining the object sought.

In the drawings, A represents the front sill or finger-beam of a harvesting-machine having thereon finger-guards $a$, carrying a sickle, as usual, the sickle and its operating devices not being shown, but being constructed, arranged, and operating in any usual and well-known manner. The platform has a rear sill, A', as usual, and is to be connected by suitable cross-sills, and at its grain end is to be provided with a grain-wheel and divider in the usual manner.

B is a conveyer, in this case being a belt made of canvas or other suitable material, and having cross-slats $b$, of wood or other material, to engage the grain and move it forward toward the delivery.

C is a roller supported in suitable bearings on the front and rear sill of the platform at the delivery end, over which the belt or apron B passes, which roller is to be driven from some moving part of the machine, as usual, to operate the belt or apron.

Figure 1:
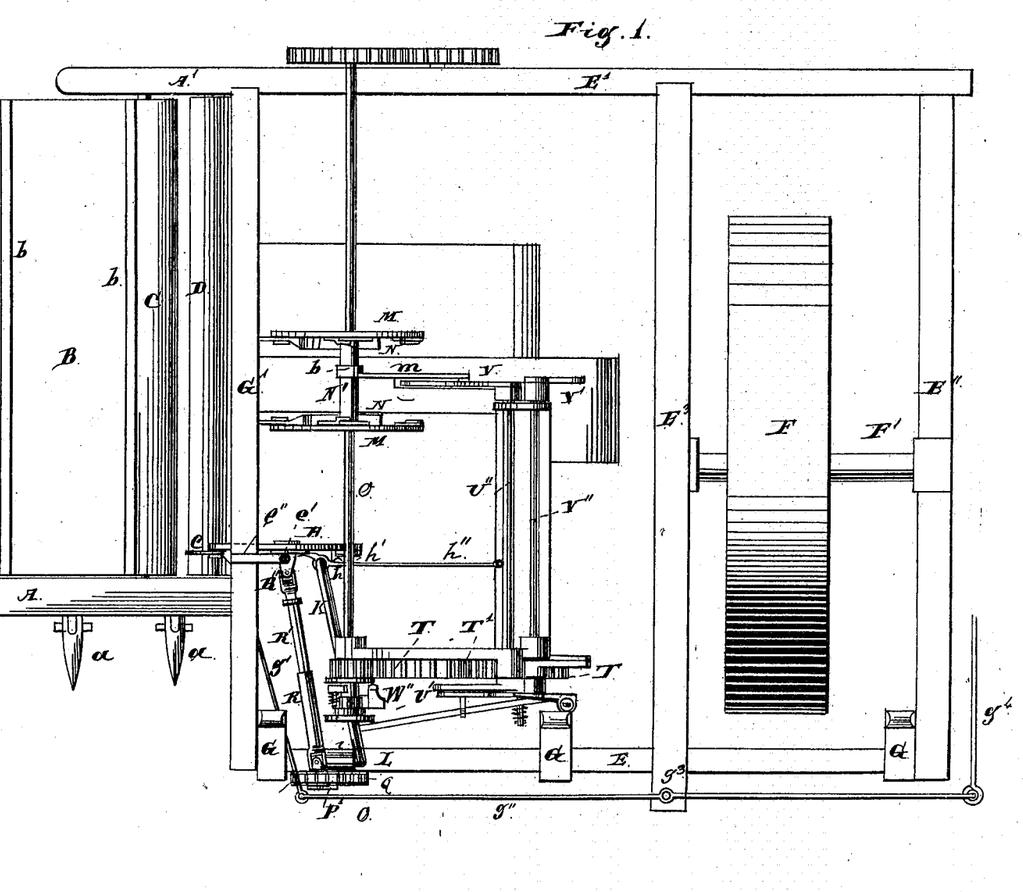
Figure 1 is a top or plan view, showing so much of the frame-work and the operating devices as is necessary to illustrate the location and arrangement of the devices forming this invention.
Figure 2:
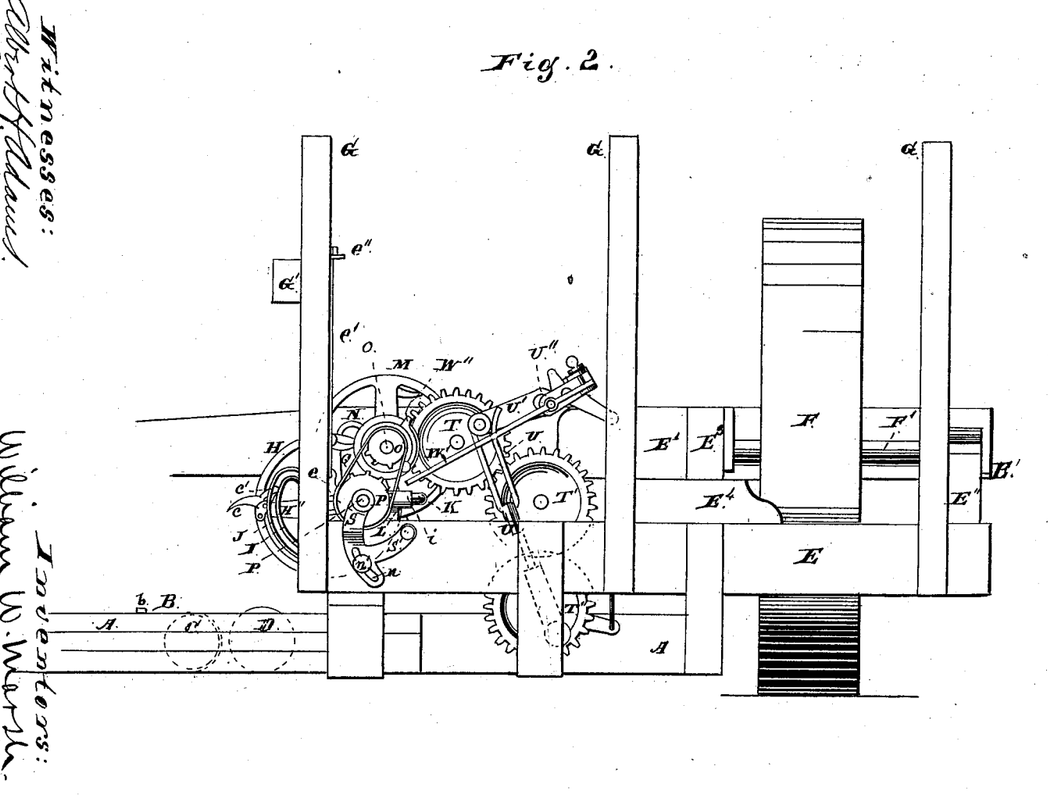
Fig. 2, a front elevation with the carrier-platform broken off and the reel and its actuating devices and the binding-arm devices not shown.
Figure 3:
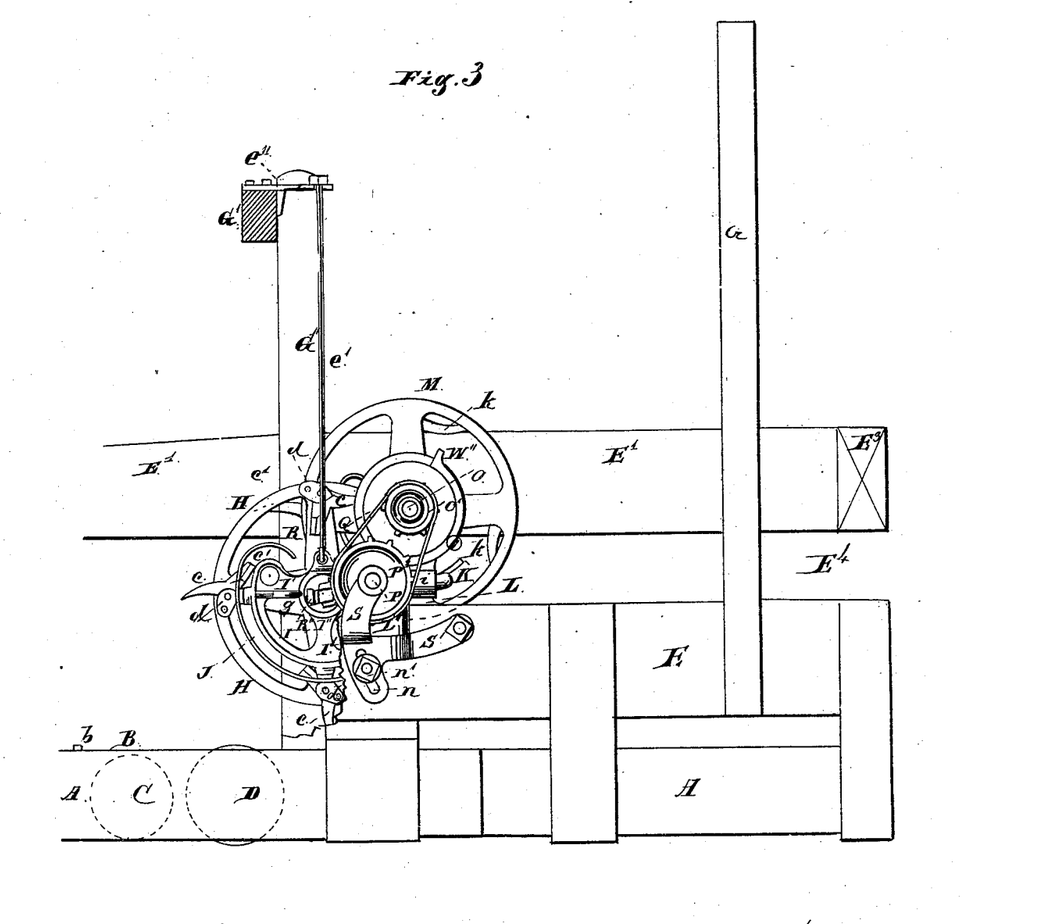
Fig. 3, an enlarged front elevation, showing a portion of the frame-work with the grain-delivery devices in their relation to each other and to the carrier-platform.
Figure 4:
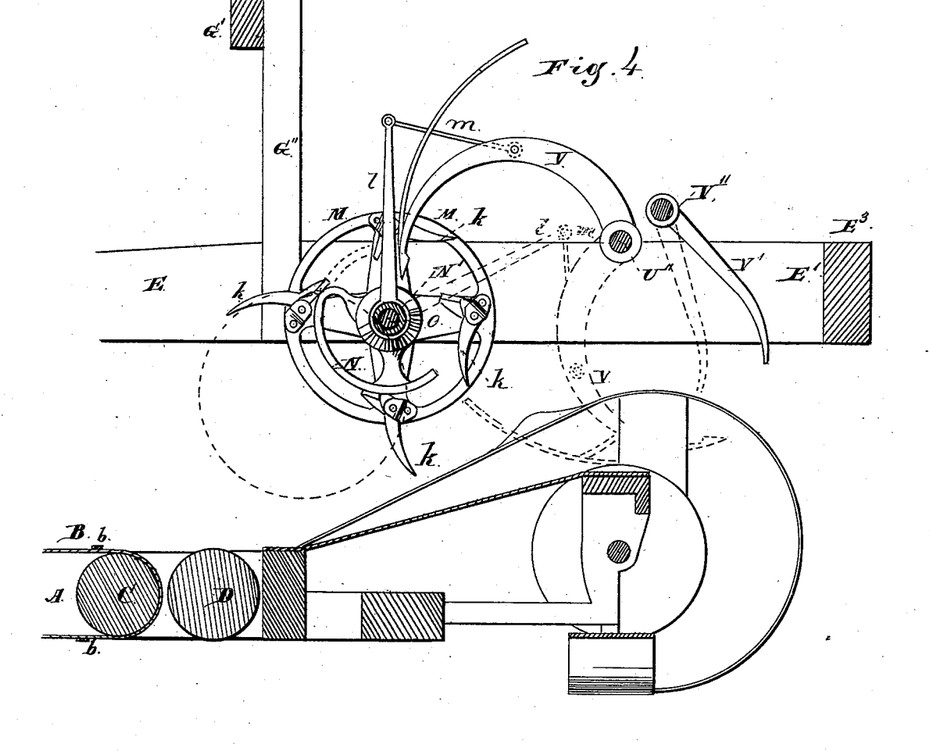
Fig. 4, an enlarged detail, showing the grain-delivery devices and the binding-arm in their relation to each other.
Figure 5:
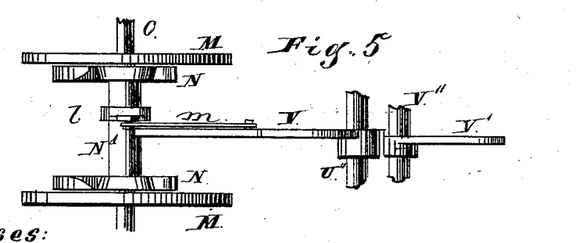
Fig. 5, a detail showing the packing disks or cams and binding-arm and connection between the binding-arm and the cams.

D is a roller located in close proximity to the roller C, and is so connected with a moving part of the machine—such as the drive-wheel—that the adjacent sides of the two rollers C and D travel in opposite directions, as indicated by the arrows, Fig. 4, all in such manner that the roller D acts as a clearer to lift the grain from the canvas or apron at its delivery end, thus preventing the grain from passing around with the apron between the two rollers.

E is the front sill of the binder-frame; E', the rear sill; E'' E³, cross-sills, between which is located the main or drive wheel; E⁴, a block on top of the front sill, E, and forming a rest for the forward end of the cross-sill E³.

F is the main or drive wheel, having its axle F' supported in suitable bearings on the cross-sills E'' E³.

G represents reel-posts, from which a reel is to be suspended in the usual manner; G', a cross-piece extending from the inner reel-post to a rear post, G''.

H is an adjustable disk or wheel, which may be formed, as shown, of an outer flange or rim, H', and arms or spokes H'', connecting such rim with a center or hub, by means of which hub and a suitable pin or bolt the disk can be secured to its driving-shaft. This disk or wheel H carries around its periphery teeth located, as shown, at equal distances apart, four being used, as shown. Each tooth is formed with an acting portion, $c$, curved or bent with a sharp point and a heel or rear portion, $c'$, which is broadened out to give a bearing-surface, and each tooth is pivoted by a suitable pin or pivot between an ear or support, $d$, and the face of the disk, the ear being attached to the disk by a suitable rivet, bolt, or otherwise. The teeth are located in such relation to the periphery or edge of the disk as, when in working position, to project beyond such periphery or edge, and when non-acting to drop below the periphery or edge, and, as shown, their limit or swing is controlled by the ear below which it is pivoted, which forms a stop in both directions.

Figures 6, 7, 8, 9, 10, 11, 12, 13:
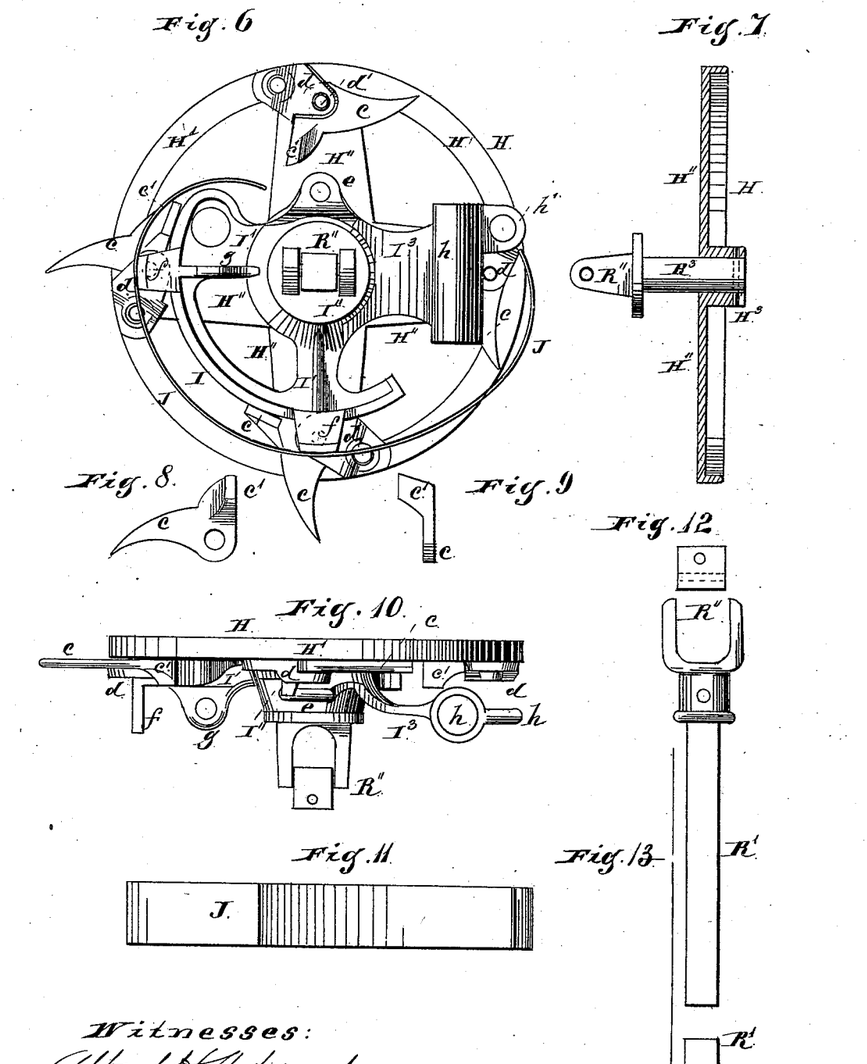
Fig. 6, an enlarged detail of the toothed wheel or disk and the cam and guard forming the butter.
Fig. 7, a central section of the ring or disk with the other devices removed.
Figs. 8 and 9, details showing the form of teeth.
Fig. 10, a top or plan view of the disk or wheel, the teeth-cam, and devices forming the butter.
Fig. 11, a detail, being a top or plan view of the guard.
Figs. 12 and 13, details of the jointed shaft for driving the butter.
Figures 14, 15, 16, 17, 18:
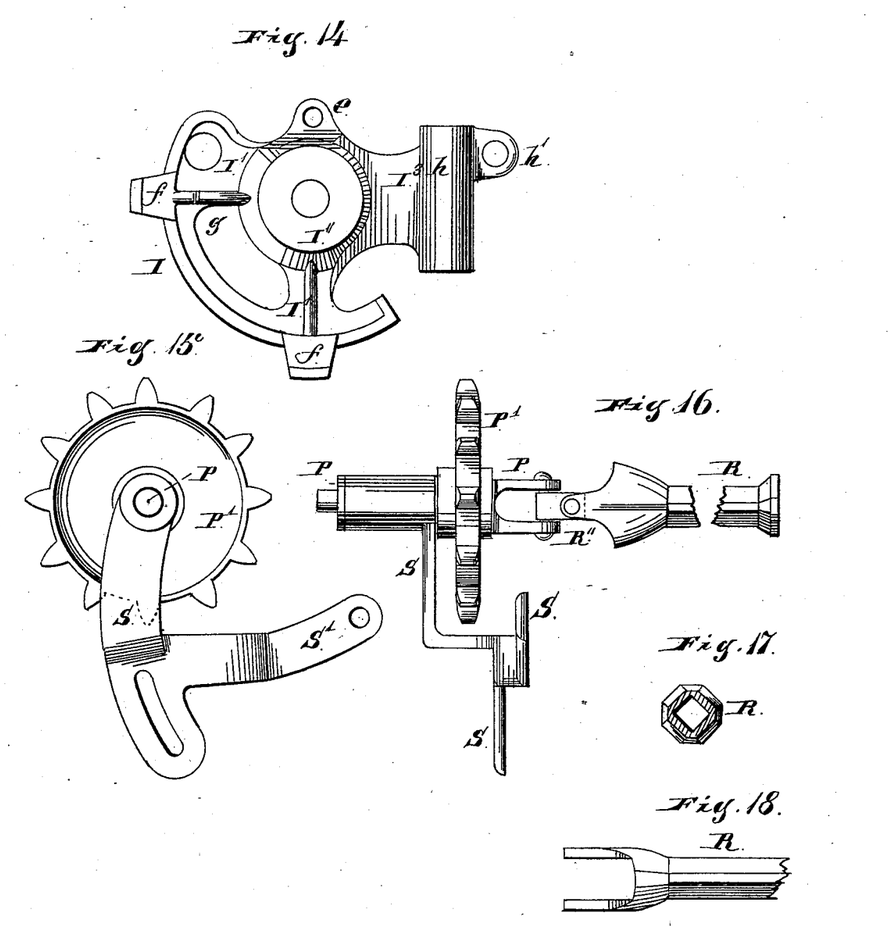
Fig. 14, a detail, being a side elevation of the tooth-cam.
Figs. 15, 16, 17, and 18, details of the sprocket-wheel, its support, and shafting for driving the butter.

I is a segmental rim or flange formed in the arc of a circle of less diameter than the disk or wheel H, and connected by arms or spokes I' to a hub or center, I'', from which hub or center extends out an arm or spoke, I³, having at its end a socket or tubular head, $h$, on which is an eye or ear, $h'$. The hub I'' of this segmental frame has an opening for the passage of the shaft by which the disk or wheel H is rotated, so that the disk and wheel and the segmental frame or sector I have the same center support, bringing their peripheries or edges in corresponding circles, as shown in Fig. 6. The rim or flange I forms a camway or track for the heels $c'$ of the pivoted teeth on the rim or disk H to come in contact with and ride over, so that the acting ends of such teeth, when their heels are engaged with I, will be held projected into position for use, and remain so projected while the heel is in contact with the rim or flange, but free to drop into their non-acting position when the heel leaves the terminal end of the rim or flange, as shown in Fig. 6. This rim or flange, with its arms or spokes, forms a frame for suspending or holding the disk in position, and, as shown, its center or hub is provided with an ear or projection, $e$, having a hole through which passes the end of a rod, $e'$, the upper end of which is hooked or connected to a plate, $e''$, attached to the cross-bar G', the rod being of the required length to suspend the disk in proper relation to the platform, and also permitting perfect freedom of movement for the disk to rise and fall to suit the grain. The disk is held from forward and backward movements by means of a tie-rod, $h''$, which is secured at one end to some part of the frame-work of the machine and at the other end to the eye $h'$.

J is a guard, of sheet metal or other suitable material, secured to the flange or rim I by connecting arms or pieces $f$, and furnishing a means for preventing the straw or grain from entering and interfering with the operation of the devices. This guard is somewhat longer than the rim or flange, and extends around and is located in relation to the flange, as shown in Fig. 6, or in some other manner.

K is a guide-rod, one end of which enters the socket $h$ and the other enters a bearing or box, $i$, on a plate, L, attached to the framework of the machine at the proper point for the rod to maintain the disk and frame in position, and at the same time allow the disk to rise and fall, and also to be turned and run at different angles in relation to the platform or carrier.

L is a plate or support for the bearing for the end of the shaft K, and attached to the frame by bolts or otherwise.

M represents the packers, which may be formed of disks or wheels consisting of an outer flange, connecting arms or spokes, and a center or hub similar to the disk or wheel H, and each wheel or disk is provided with a series of teeth, $k$, similar in construction to the teeth $c$ $c'$ on the wheel or disk H, and pivotally connected with the wheel or disk in a manner similar to the connection of the teeth $c$ $c'$, the only difference between the two sets of teeth being that the teeth $k$ are longer than the teeth $c$ $c'$.

N are flanges, one located or arranged adjacent to each wheel or disk M, and corresponding in general construction to the rim or flange I, and each for the same purpose as such flange, and acting to hold the teeth $k$ projected in working position, and allowing such teeth to drop into a non-acting position, the same as the flange I operates in connection with the teeth $c$ $c'$. These flanges N are connected by their arms or spokes with a tube or bearing, N', instead of each having an independent center or hub, the object being to provide for the adjustment of the cams simultaneously. An arm, $l$, extends up from the tube or bear N', and to its upper end is attached a rod or bar, $m$, the other end of which is connected with a binding-arm, so that as the binding-arm vibrates or oscillates a rocking movement will be imparted to the tube or bearing N', giving the flanges or rims N a corresponding movement, and changing their location in relation to the point of contact and travel of the teeth $k$ thereover. The object of thus changing the relative position of the flanges or rims is to have the teeth $k$ projected and remain projected, so as to act on the grain while the binding-arm is elevated to force the grain into the binder, and when the binding-arm is depressed and the binding operation is being performed to have the cams N project the teeth at a higher point, so that they will not act on the grain, but will drop into their non-acting position by passing the end of the cams before reaching a point where they will enter the grain. This arrangement of disks M and cams N, and a connection of the cams with the binding-arm, automatically changes the working position of the teeth in relation to the grain, so that the teeth will be acting when the binding-arm is out of the way, and non-acting when the binding-arm is down and the binding being performed, as the change in the position of the binding-arm must produce a corresponding change of the cams in relation to the point where the teeth are projected. The different positions of the binding-arm and the cams are shown in Fig. 4.

O is the main driving-shaft of the binding devices, on which are located the disks M and collar or sleeve N', with its cams or flanges N, the disks or wheels being firmly connected with the shaft, and the collar, with its flange or cams, being loose thereon, so that the disks will be revolved while the cams remain stationary, so far as any motion of the shaft is concerned.

P is a short shaft supported in a bearing or box, j, on a plate or standard, L', attached to the frame-work of the machine adjacent to the plate L.

Q is a chain passing over a sprocket-wheel, P', on the shaft-section P, and a spocket-wheel, O', on the shaft O for rotating the shaft P from the shaft O.

R R' R'' R³ are shaft sections and couplings for driving the disk H from the shaft-section P.

S S' represent a swinging support for the shaft P, by means of which the shaft is supported, and, as shown, this support is provided with a slot, n, for the passage of a bolt, n', by means of which the support can be raised or lowered to tighten the chain.

T T' T'' are a series of gear-wheels for operating the binding-arm and the binding devices through suitable shafts.

U is a connecting-link from the gear-wheel T'' to an arm, U', by means of which the binding-arm shaft U'' is given a rocking movement.

V is the binding-arm, located on the end of the shaft U'' to coact with tying devices and do the binding; V', a compressor-arm located on the shaft V'' and coacting with the binding-arm to compress the bundle.

The machine will be provided with a tilting head, W, a compressor-shaft, V'', a finger or arm, W', and a trip, W''', of the usual well-known construction, for automatically sizing the bundles. As such devices form no part of our invention, it is not deemed essential to further describe them.

Figure 19:
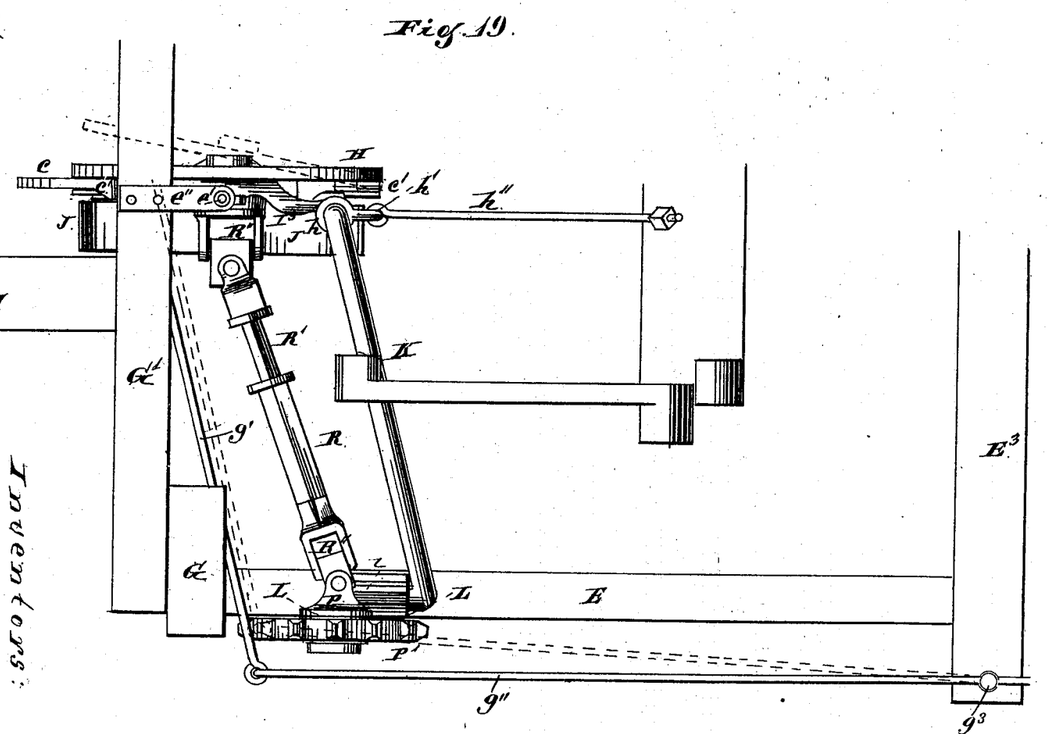
Fig. 19, an enlarged detail, showing a portion of the frame-work and two positions of the butter.

The operation is as follows: The grain as cut falls upon the platform conveyer or belt B, and is carried forward by the travel of the conveyer or belt until it reaches the roller D, over which it is passed, to be delivered to the binder by the action of the butter H and packers M, where it is bound and discharged in the usual manner. The machine is constructed of such proportions that in medium grain the center of the straw, as it falls on the platform, will be against the binding-arm V, and in that case the grain will pass directly to the binder without its direction being changed; but when the grain is short, if it passed directly to the binding-arm, the cord would be passed around the sheaf too near its head, or when the grain is long the cord would be passed too near its butts. This is prevented by setting the butter H at an angle to the conveyer B, as is shown in dotted lines in Fig. 19, the angle being varied according to the length of straw. This operation is as follows: The cut straw being brought toward the binder by the conveyer, the butts are first brought under the operation of the revolving butter H, which carries the butts rapidly forward, and as the heads are comparatively at rest the butts are carried around, as it were, in the segment of a circle, the heads being its center. By this means the butts are carried back from the finger-beam and so delivered to the packers farther back than they otherwise would be. The friction of the teeth on the butts striking them at an angle has also a very strong tendency to shove the straw toward the rear of the machine. The packers M M then carry the heads rapidly forward, the heads now describing a segment of a circle of which the butts are in turn the center. By this alternate motion and endwise friction it will be seen that the grain is delivered to the binder parallel with it, but at a considerable distance back of the grain on the platform; but when the grain is of unusual length we turn the butter H somewhat sharply at an opposite angle to that last described, and in this case the friction of the teeth on the butts of the grain draws them toward or forward of the front sill or finger-beam before the grain comes under the operation of the packers. We are thus enabled to secure the bundles being bound near their center without having to move the binder backward or forward. These packers should be acting when the binding-arm is elevated and non-acting when the binding arm is down to prevent crowding of the grain on the arm, and this result is automatically produced through the connection of the teeth-actuating cams with the binding-arm, by which such cams, when the arm is elevated, are brought into position for the teeth to act and force the grain into the binder, and is carried into position when the arm is down, while the teeth will close to act at a point back of the arm, leaving the grain at that point.

The packers M could be made in some other manner than of an annular flange or rim, a center or hub, and connecting-arms; but their construction for a rotating packer must be such as to permit rotation, and at the same time furnish a support for the teeth; but it is obvious that other forms of construction and arrangement of packing-arms could be used in connection with the butter for carrying the grain to the binder, and still be within the gist of this invention, which is the delivery of the grain in proper relation to the binder.

As shown, the butter H is turned to stand at varying angles through a rod or link, $g'$, attached at one end to the eye or ear $g$ on the cam frame or sector I, and the other is attached to an arm or rod, $g''$, which arm or rod is pivoted at $g^3$ to the cross-piece $E^3$, and this arm or rod has connected thereto a rod or link, $g^4$, which extends back and is connected with a lever operated by the driver. The swinging of the arm or lever $g''$ on its pivot $g^3$ turns the butter in or out in relation to the front of the platform, as required; but this adjusting of the butter could be done with other devices than those shown and described.

What we claim as new, and desire to secure by Letters Patent, is—

1. The combination, with a carrier, of an adjustable and vertically-revolving disk or wheel having teeth to engage the grain from the carrier, and packers arranged and operating with the disk or wheel to deliver the grain to the binder in proper position for binding, substantially as specified.

2. The combination of a carrier, an adjustable vertically-revolving disk or wheel having teeth to engage the grain from the carrier at or near the butts, and packers operating therewith to deliver the grain square or parallel with the binder, but at any desired distance back of or in front of the grain falling on the platform or carrier, substantially as specified.

3. The combination, with a carrier, of an adjustable and vertically-revolving disk or wheel having teeth to engage the grain on the carrier, means for adjusting the angle of the disk or wheel to suit the grain, and packers to deliver the grain to the binder in proper relation for binding purposes, substantially as specified.

4. The combination, with a carrier and an independent clearing-roller located at the delivery end thereof, of an adjustable and vertically-revolving disk or wheel having teeth to engage the grain on the carrier, and packers acting to deliver the grain to a binder for binding purposes, substantially as specified.

5. In a grain-binder, the combination of two disks or wheels arranged to rotate parallel with each other, and each provided with a series of pivoted packer-teeth, two rims or flanges, N, arranged respectively at one side of each wheel or disk, a bearing, N', connecting the two rims or flanges, and provided with the projecting arm $l$, and a connection between said arm and the binder-arm, whereby the latter is caused to simultaneously operate the rims or flanges to actuate the teeth of both disks or wheels, substantially as described.

6. The vertically-revolving toothed disk or wheel H, in combination with the toothed disks or wheels M for changing the flow of the grain and carrying it to a self-binder, substantially as specified.

WILLIAM W. MARSH.
MAURICE E. BLOOD.

Witnesses:
A. M. STARK,
ALBERT H. ADAMS.